US011444925B1

(12) United States Patent
Patimer et al.

(10) Patent No.: US 11,444,925 B1
(45) Date of Patent: Sep. 13, 2022

(54) SECURE ACCESS TO A CORPORATE APPLICATION IN AN SSH SESSION USING A TRANSPARENT SSH PROXY

(71) Applicant: CA, Inc., San Jose, CA (US)

(72) Inventors: David Patimer, Tel Aviv (IL); Lior Lev-Tov, Tel Aviv (IL); Eldad Rudich, Tel Aviv (IL); Leonid Belkind, Tel Aviv (IL)

(73) Assignee: CA, Inc., San Jose, CA (US)

( * ) Notice: Subject to any disclaimer, the term of this patent is extended or adjusted under 35 U.S.C. 154(b) by 130 days.

(21) Appl. No.: 16/591,365

(22) Filed: Oct. 2, 2019

Related U.S. Application Data

(60) Provisional application No. 62/832,038, filed on Apr. 10, 2019.

(51) Int. Cl.
*H04L 9/40* (2022.01)

(52) U.S. Cl.
CPC ...... *H04L 63/0281* (2013.01); *H04L 63/0853* (2013.01); *H04L 63/102* (2013.01); *H04L 63/20* (2013.01)

(58) Field of Classification Search
CPC ............. H04L 63/0281; H04L 63/0853; H04L 63/102; H04L 63/20
USPC .......................................................... 726/1
See application file for complete search history.

(56) References Cited

U.S. PATENT DOCUMENTS 7,475,420 B1 * 1/2009 Hernacki ............ H04L 63/0281
726/12
9,578,063 B1 2/2017 Iyer et al.
9,813,418 B1 11/2017 Banerjee
9,813,478 B2 11/2017 Koo et al.
10,038,726 B2 7/2018 Gaddam et al.
10,171,484 B2 1/2019 Balasubramanian et al.
10,284,532 B2 5/2019 Quinlan et al.
(Continued)

FOREIGN PATENT DOCUMENTS

WO WO-2011-126507 A1 10/2011

OTHER PUBLICATIONS

Rouse, Margaret; Tech Target: "immutable inftastructure"; webpage located at: https://searchitoperations.techtarget.com/definition/immutable-infrastructure; Jul. 2016; 4 pages.
(Continued)

*Primary Examiner* — Anthony D Brown
(74) *Attorney, Agent, or Firm* — Adsero IP

(57) ABSTRACT

Secure access to a corporate application in an SSH session using a transparent SSH proxy. In some embodiments, a method may include receiving, at a secure access cloud point of delivery (PoD), from a client application on a client device, a request to access a corporate application that is deployed in a corporate datacenter. The method may also include forwarding, from the secure access cloud PoD, to a connector that is also deployed in the corporate datacenter, the request. The method may further include brokering, by the connector and the secure access cloud PoD, authentication of a user, authorization of access by the user, and an SSH session between the client application and the corporate application using a transparent SSH proxy, with the client application being unaware that the SSH session is brokered by the connector and the secure access cloud PoD.

20 Claims, 14 Drawing Sheets

(56) References Cited

U.S. PATENT DOCUMENTS

| | | | |
|---|---|---|---|
| 10,397,185 B1 | 8/2019 | Sandholm et al. | |
| 10,425,411 B2 | 9/2019 | Huang | |
| 10,962,136 B2 | 3/2021 | Tolentino | |
| 2004/0022237 A1 | 2/2004 | Elliot et al. | |
| 2005/0125083 A1 | 6/2005 | Kiko | |
| 2006/0122861 A1 | 6/2006 | Scott et al. | |
| 2008/0146265 A1 | 6/2008 | Valavi | |
| 2010/0174811 A1 | 7/2010 | Musiri et al. | |
| 2014/0075031 A1 | 3/2014 | Doering et al. | |
| 2014/0172483 A1 | 6/2014 | Bellers et al. | |
| 2014/0195805 A1 | 7/2014 | Koo et al. | |
| 2014/0317409 A1* | 10/2014 | Bartok | H04L 63/0823 713/171 |
| 2014/0366080 A1 | 12/2014 | Gupta et al. | |
| 2016/0378535 A1 | 12/2016 | Oh et al. | |
| 2017/0149733 A1 | 5/2017 | Chastain et al. | |
| 2018/0063164 A1 | 3/2018 | Balasubramanian et al. | |
| 2018/0219736 A1* | 8/2018 | Bugenhagen | H04L 41/0853 |
| 2018/0287864 A1 | 10/2018 | Hockett et al. | |
| 2018/0367557 A1 | 12/2018 | Brown et al. | |
| 2019/0020723 A1 | 1/2019 | Kumar et al. | |
| 2019/0081930 A1 | 3/2019 | Hunt, IV | |
| 2019/0190960 A1 | 6/2019 | Amro et al. | |
| 2019/0208009 A1 | 7/2019 | Prabhakaran et al. | |
| 2020/0241926 A1 | 7/2020 | Guim Bernat | |
| 2021/0019194 A1 | 1/2021 | Bahl et al. | |
| 2021/0311655 A1 | 10/2021 | Benjamin et al. | |

OTHER PUBLICATIONS

Wikipedia, "Flow control (data)"; on-line encyclopedia; webpage located at: https://en.wikipedia.org/wiki/Flow_control_(data); Sep. 13, 2019; 6 pages.

United States Provisional Patent Application; U.S. Appl. No. 16/591,318; titled "Secure Access to a Corporate Application Over a Websocket-Based Connection"; filed Oct. 2, 2019; 60 pages.

United States Provisional Patent Application; U.S. Appl. No. 16/591,335; titled "Secure Access to a Corporate Application Using a Facade"; filed Oct. 2, 2019; 51 pages.

United States Provisional Patent Application; U.S. Appl. No. 16/591,347; titled "Secure Access to a Corporate Web Application With Translation Between an Internal Address and an External Address"; filed Oct. 2, 2019; 43 pages.

U.S. Appl. No. 16/591,318, Non-Final Office Action, dated Dec. 24, 2021, 37 pages.

U.S. Appl. No. 16/591,335, Non-Final Office Action, dated Nov. 1, 2021, 43 pages.

U.S. Appl. No. 16/591,347, Non-Final Office Action, dated Sep. 2, 2021, 24 pages.

U.S. Appl. No. 16/591,347, Notice of Allowance, dated Jan. 14, 2022, 21 pages.

U.S. Appl. No. 16/591,347, Notice of Allowance, dated Apr. 15, 2022, 148 pages.

U.S. Appl. No. 16/591,335, Notice of Allowance, dated May 12, 2022, 24 pages.

U.S. Appl. No. 16/591,318, Final Office Action, dated Jun. 27, 2022, 43 pages.

* cited by examiner

| Accessed Resource Type | Protocol | Accessing Application | Authentication Schemes |
|---|---|---|---|
| Web Portal / Application | HTTPS | Any Web Browser Supporting HTTPS 1.1 | Session Authentication - SAML, OAUTH2, OpenID Connect, User/Password + MFA |
| REST / SOAP APIs | HTTPS | Any Application Supporting TLS-Based REST/SOAP API Client | OAuth2 |
| SSH Server (Linux / Unix / Windows) | SSH | Any SSH Client | One-Time Token, RSA Keys |
| SCP/SFTP Server | SSH | Any SCP/SFTP Client | One-Time Token, RSA Keys |
| Windows Remote Desktop Servers | RDP Over HTTPS | Any Microsoft Remote Desktop Protocol Client Supporting Remote Desktop Gateways | NTLM, SPNEGO |
| Native Application To Its Dedicated Back-End | TCP Over SSH | Any Native Application Supporting SSH Tunneling Or Any Native Application In Combination With SSH Client Supporting Tunneling | One-Time Token, RSA Keys |

FIG. 3

SECURE ACCESS TO A CORPORATE APPLICATION IN AN SSH SESSION USING A TRANSPARENT SSH PROXY

CROSS-REFERENCE TO A RELATED APPLICATION

This application claims the benefit of, and priority to, U.S. Provisional Application No. 62/832,038, filed Apr. 10, 2019, which is incorporated herein by reference in its entirety for all that it discloses.

BACKGROUND

Organizations have traditionally secured their networks using a perimeter-based approach. In a traditional perimeter-based approach to network security, an organization may have a local area network that includes devices hosting corporate network resources (e.g., corporate applications, services, and/or workloads) housed in a well-defined location, such as in the organization's headquarters building or dedicated datacenter. The network may be secured using a traditional security perimeter and firewall that can protect the devices within the network from attack. When a user seeks to use corporate network resources hosted in those locations from their device (e.g., from their mobile device), the user may connect their device to the network from outside the security perimeter by employing software installed on the device, such as virtual private network (VPN) software, to create a secure connection with the network in order to access corporate network resources.

One challenge to a perimeter-based approach to network security is that more and more organizations are moving corporate network resources outside their network perimeters to the cloud. This has resulted in network architectures that are generally cloud-oriented and do not have a traditional network perimeter. For example, more and more organizations utilize corporate network resources that are hosted by multiple third parties, such as Azure, Amazon Web Services (AWS), and Google. Enterprise IT security programs can become complicated and difficult as organizations outsource infrastructure in this manner while remaining responsible for data and users. Further, users increasingly desire to have access to corporate network resources whether on-premises or off-premises, and at any time of day or night, also known as "anytime, anywhere access." However, using traditional network security approaches, such as using VPN software installed on a device, is increasingly burdensome to users in cloud-oriented network architectures.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for secure access to a corporate application in an SSH session using a transparent SSH proxy may be performed, at least in part, by a computer system including one or more processors. The method may include receiving, at a secure access cloud point of delivery (PoD), from a client application on a client device, a request to access a corporate application that is deployed in a corporate datacenter. The method may also include forwarding, from the secure access cloud PoD, to a connector that is also deployed in the corporate datacenter, the request to access the corporate application. The method may further include brokering, by the connector and the secure access cloud PoD, authentication of a user, authorization of access by the user, and an SSH session between the client application and the corporate application using a transparent SSH proxy, with no corresponding agent being installed at the client device, and with the client application being unaware that the SSH session is brokered by the connector and the secure access cloud PoD.

In some embodiments, the transparent SSH proxy may include an SSH server paired with an SSH client that are both transparent to the client application. In these embodiments, the method may further include receiving SSH session requests, at the SSH server, from the client application, sending the SSH session requests, from the SSH server, to the SSH client, and sending the SSH session requests, from the SSH client, to the corporate application via the connector. Also, in these embodiments, authentication between the client application and the SSH server may be separate from authentication between the SSH client and the corporate application to prevent direct access to the corporate application by the client application.

In some embodiments, the transparent SSH proxy may include an SSH server paired with an SSH client that are both transparent to the client application, and an HTTP/S proxy. In these embodiments, the method may further include receiving SSH session requests, at the HTTP/S proxy, from the client application, sending the SSH session requests, from the HTTP/S proxy, to the SSH server, sending the SSH session requests, from the SSH server, to the SSH client, and sending the SSH session requests, from the SSH client, to the corporate application via the connector. Also, in these embodiments, authentication between the client application and the SSH server may be separate from authentication between the SSH client and the corporate application to prevent direct access to the corporate application by the client application.

In some embodiments, the authentication of the user may be performed using an identity provider (IdP). In these embodiments, the authentication of the user using the IdP may include the user logging in to a web portal, redirecting the user to the IdP which enforces authentication of the user, returning, from the IdP, a token, and authenticating the user in the SSH session using the token. Also, in these embodiments, the IdP may enforce Multi-Factor Authentication (MFA) of the user. Alternatively, in these embodiments, the authentication of the user using the IdP may include the user logging in to a web portal, redirecting the user to the IdP which enforces authentication of the user, returning, from the IdP, an SSH certificate, and authenticating the user in the SSH session using the SSH certificate. Also, in these embodiments, the IdP may enforce MFA of the user. Further, in these embodiments, the SSH certificate may also be used for the authorization of access by the user. Also, in these embodiments, an expiration and/or a validity of the SSH certificate may be controlled by the transparent SSH proxy. Further, in these embodiments, the method may further include enforcing an out-of-bound second factor authentication request to the user.

In some embodiments, the transparent SSH proxy may have a transparent SSH agent. In these embodiments, the transparent SSH agent may create session keys for the SSH session and/or may enforce authorization policy for the SSH session. Also, in these embodiments, the transparent SSH agent may cache SSH keys/credentials for the SSH session and may allow automated authentication of the user.

In some embodiments, one or more non-transitory computer-readable media may include one or more computer-readable instructions that, when executed by one or more processors of a computer system, cause the computer system to perform a method for secure access to a corporate application in an SSH session using a transparent SSH proxy.

In some embodiments, a computer system may include one or more processors and one or more non-transitory computer-readable media. The one or more non-transitory computer-readable media may include one or more computer-readable instructions that, when executed by the one or more processors, cause the computer system to perform a method for secure access to a corporate application in an SSH session using a transparent SSH proxy.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which:

FIG. 3 is a table summarizing various supported connectivity scenarios and authentication schemes;

DETAILED DESCRIPTION

Traditional perimeter-based approaches to network security have required users who desire to access corporate network resources (e.g., corporate applications, services, and/or workloads) to do so using a device that is either located within a secure perimeter of a network or that is connected to the network using software installed on the device, such as virtual private network (VPN) software. While users increasingly desire to have "anytime, anywhere access" to corporate network resources, using traditional network security approaches, such as using VPN software installed on a device, is increasingly burdensome to users in cloud-oriented network architectures.

The embodiments disclosed herein may provide various benefits. In particular, the embodiments disclosed herein may, for example, enable secure access to corporate network resources (e.g., corporate applications, services, and/or workloads) located in a variety of environments, such as self-hosted datacenters, co-location/hosting, Infrastructure-as-a-Service, Platform-as-a-Service, Software-as-a-Service and more. For example, embodiments disclosed herein may enable organizations to secure their networks without requiring devices to connect to the network within a traditional security perimeter and without requiring devices to connect to the network by installing software on the devices, such as VPN software. Instead, embodiments disclosed herein may enable organizations to have network architectures that are generally cloud-oriented and that are inside or outside a traditional network perimeter, as well as enabling organizations to utilize network resources that are hosted by multiple third parties such as Azure, A W S, and Google, all while enabling users to have "anytime, anywhere access" to network resources.

Figure 1:
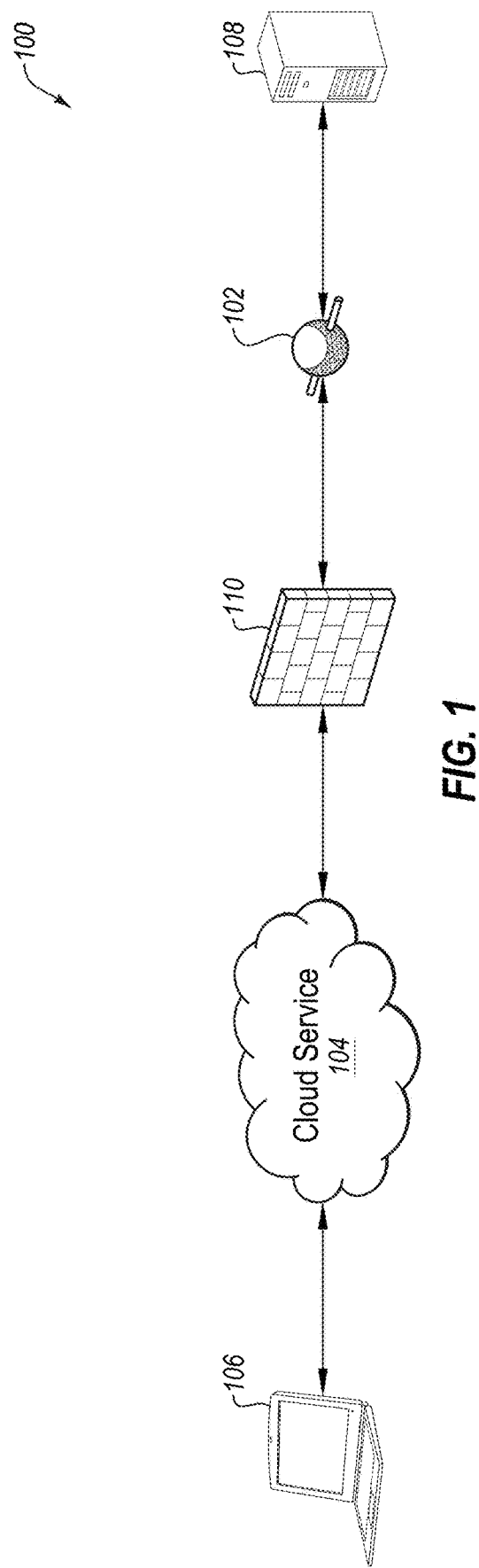
FIG. 1 illustrates an example system configured for providing secure access to corporate network resources.

Turning to the figures, FIG. 1 illustrates an example system 100 configured for providing secure access to corporate network resources. Some embodiments may include an example Software as a Service (SaaS) platform, that may allow corporate information technology (IT) organizations to provide secure connectivity to corporate applications and services for designated audiences. The SaaS platform may provide this secure connectivity without exposing internal networks/datacenters to risks associated with network access, and may provide visibility and governance into activities that are performed by the accessing parties.

As disclosed in FIG. 1, the SaaS platform may be configured to provide access by including a connector 102 deployed inside (e.g., behind a firewall 110 of) the corporate datacenter (which may be physical or virtual) that is configured to reach out to a cloud service 104 Point of Delivery (PoD) and configured to wait for requests from authorized/authenticated users for resources. The user at their device 106 (e.g., their workstation or mobile device) may run any kind of client application (e.g., a web browser, a Secure Shell (SSH) client, a Remote Desktop Protocol (RDP) client, a database workbench, etc.) and may then connect to a particular corporate resource 108 by name (e.g., myresource.mycompany.com). The client application may then connect to the cloud service 104 (where the Domain Name System (DNS) record points) and the cloud service 104 may handle the authenticating of the user, the authorizing of the access (as well as taking additional steps), and the brokering of the connectivity (e.g., via Layer 7) to the actual resource.

Figure 2:
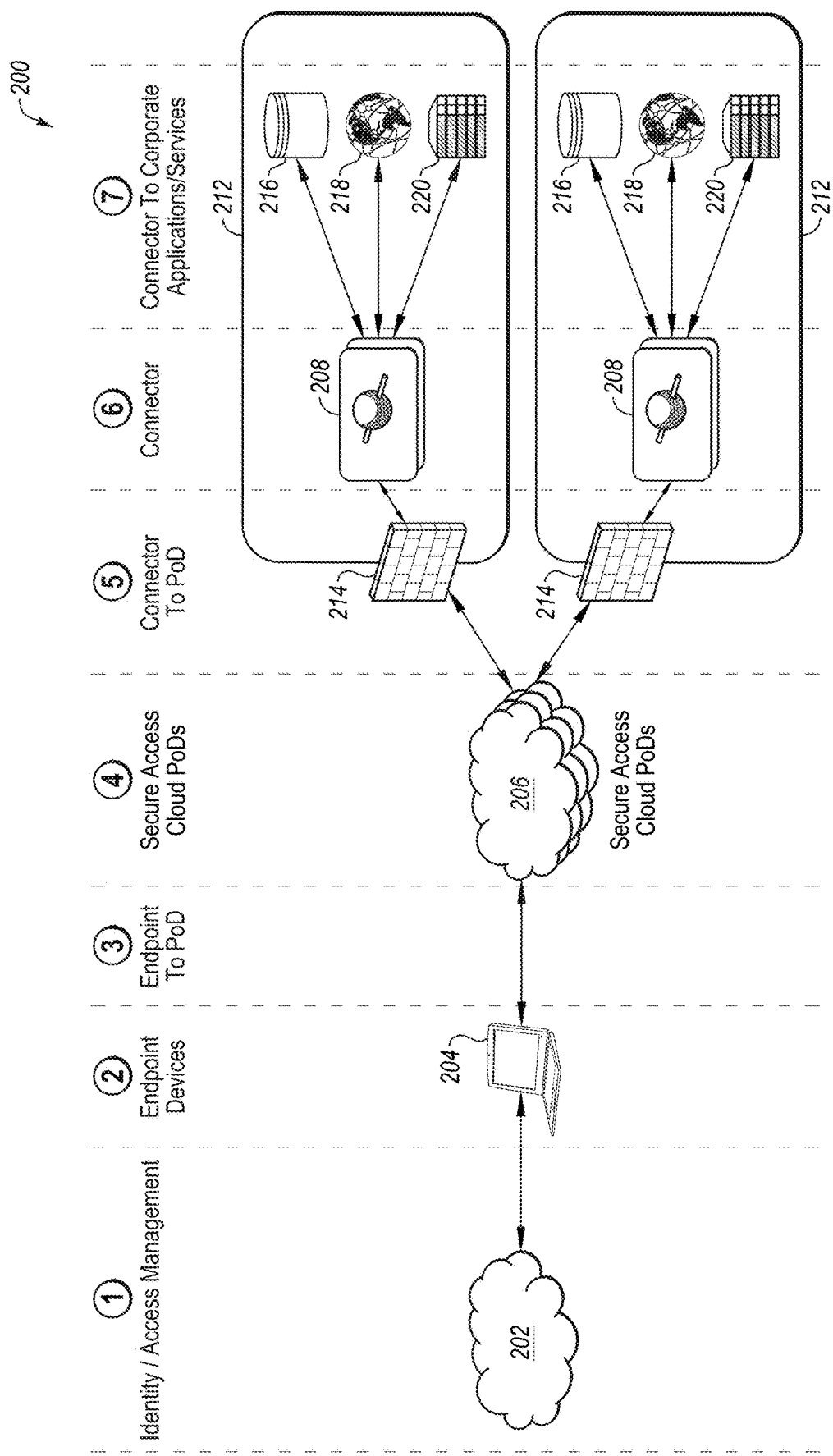
FIG. 2 illustrates another example system configured for providing secure access to corporate network resources.

FIG. 2 illustrates another example system 200 configured for providing secure access to corporate network resources. More particularly, FIG. 2 illustrates various layers of the SaaS platform disclosed herein.

Layer 1 of FIG. 2 is an identity/access management layer. Some enterprise solutions may be deployed either as an Identity as a Service (IDaaS) or on a corporate premises. The SaaS platform disclosed herein may be configured to integrate with any Security Assertion Markup Language (SAML), OpenID Connect/OAuth2 provider, as well as with dedicated on-premises deployments of Microsoft Active Directory and other Lightweight Directory Access Protocol (LDAP)-based identity solutions. For example, the SaaS platform disclosed herein may support any of the following authentication methods 202 for end-users and administrators:

Microsoft Azure Active Directory—can support
    Microsoft Azure Active Directory using Azure AD Connect synchronization, and can also be used in combination with Active Directory Federation Services (ADFS) to authenticate via an on-premises infrastructure.

Microsoft Active Directory—may involve either installing an on-premises agent for synchronization and pass-through authentication or using ADFS, in which case the on-premises agent may only be used for users/groups synchronization.

Okta—can support various Directory Services using dedicated Okta Connectors.

OneLogin—can support various Directory Services using dedicated OneLogin Connectors.

Google GSuite.

Authentication via OAuth2/OpenID Connect or SAML protocols with external Identity Providers (IdPs).

Internal Users Database.

The authentication methods 202 may provide access to an Administrative Portal, a User Portal, and applications and services delivered through the SaaS platform. When accessing SSH servers via the SaaS platform, or when connecting to native applications with SSH tunneling, the SaaS platform may support the following authentication methods 202 for SSH sessions (which may not replace the corporate identity services above, but may serve as a bridge to a corporate identity of the accessing party, as governed by the identity providers):

Temporary Access Token (generated from the User Portal upon successful authentication using any of the above methods).

Using a Rivest-Shamir-Adleman (RSA) Key generated in the User Portal.

Layer 2 of FIG. 2 is an endpoint devices layer. The SaaS platform disclosed herein may be a client-less solution, capable of providing secure access/connectivity from any endpoint device 204, such as any personal computer (PC) platform (e.g., Windows, Mac OS X, or Linux) or any mobile platform (e.g., iOS, Android, etc.), as well as from dedicated embedded or thin-client platforms (e.g., Chromebook, etc.). This secure access/connectivity may be delivered using the standard applications including, but not limited to, web browsers, SSH clients, RDP clients, service-2-service or API access, as well as dedicated applications for accessing databases, data warehouses, and other special repositories. To ensure that access to sensitive corporate resources is performed only from compliant devices, the SaaS platform can integrate with Endpoint Threat Detection and Response (EDR), Mobile Device Management, and Device Security Posture management solutions.

Layer 3 of FIG. 2 is a connectivity layer. The connectivity between applications running on users' endpoints and the SaaS platform disclosed herein (referred to in FIG. 2 as the secure access cloud PoDs 206) may be accomplished over point-to-point secure connections, using Transport Layer Security (TLS) 1.2 for example. The SaaS platform either may provide automatically-generated TLS certificates or may integrate with existing corporate Public Key Infrastructure (PKI) to generate them. FIG. 3 is a table 300 summarizing various supported connectivity scenarios and authentication schemes. However, the SaaS platform disclosed herein is not limited to supporting only the protocols disclosed in the table 300 of FIG. 3. Instead, any point-to-point Transmission Control Protocol (TCP) connection, point-to-point protocols based on UDP, such as QUIC or upcoming HTTP/3, as well as dedicated TCP protocols (e.g., over TCP Port xyz), may be supported, among others.

Layer 4 of FIG. 2 is a secure access cloud PoDs layer. The secure access cloud PoDs 206 may be deployed in resilient and scalable Infrastructure as a Service (IaaS) datacenters hosted, for example, by AWS and Microsoft Azure. The secure access cloud PoDs 206 may also be deployed on bare-metal or hosting facilities, limiting their scalability to the resources provided by the specific facility. Each of the secure access cloud PoDs 206 may be deployed as immutable infrastructure, isolated from all other networks managed by the SaaS platform disclosed herein. The secure access cloud PoDs 206 and the service operations may be subject to continuous internal and external audits and reports and certifications, such as, but not limited to:

AICPA SSAE 18 SOC 2 Type II Report

ISO 27001 Certification

FedRAMP Certification

AWS Well Architected Review/Report

Penetration tests performed by third party organizations

Transparency in observability of operational practices, uptime statistics and other parameters of the secure access cloud PoDs 206 may be a desirable feature of the platform.

The SaaS platform disclosed herein may deploy numerous management, monitoring, and security solutions to ensure uninterrupted service for customers, including protection from advanced attacks, including Distributed Denial of Service (DDoS) attacks. Further, the SaaS platform disclosed herein may be designed to ensure uninterrupted access for end-users when a deployment/upgrade is performed using a "draining" technique.

Figure 4:
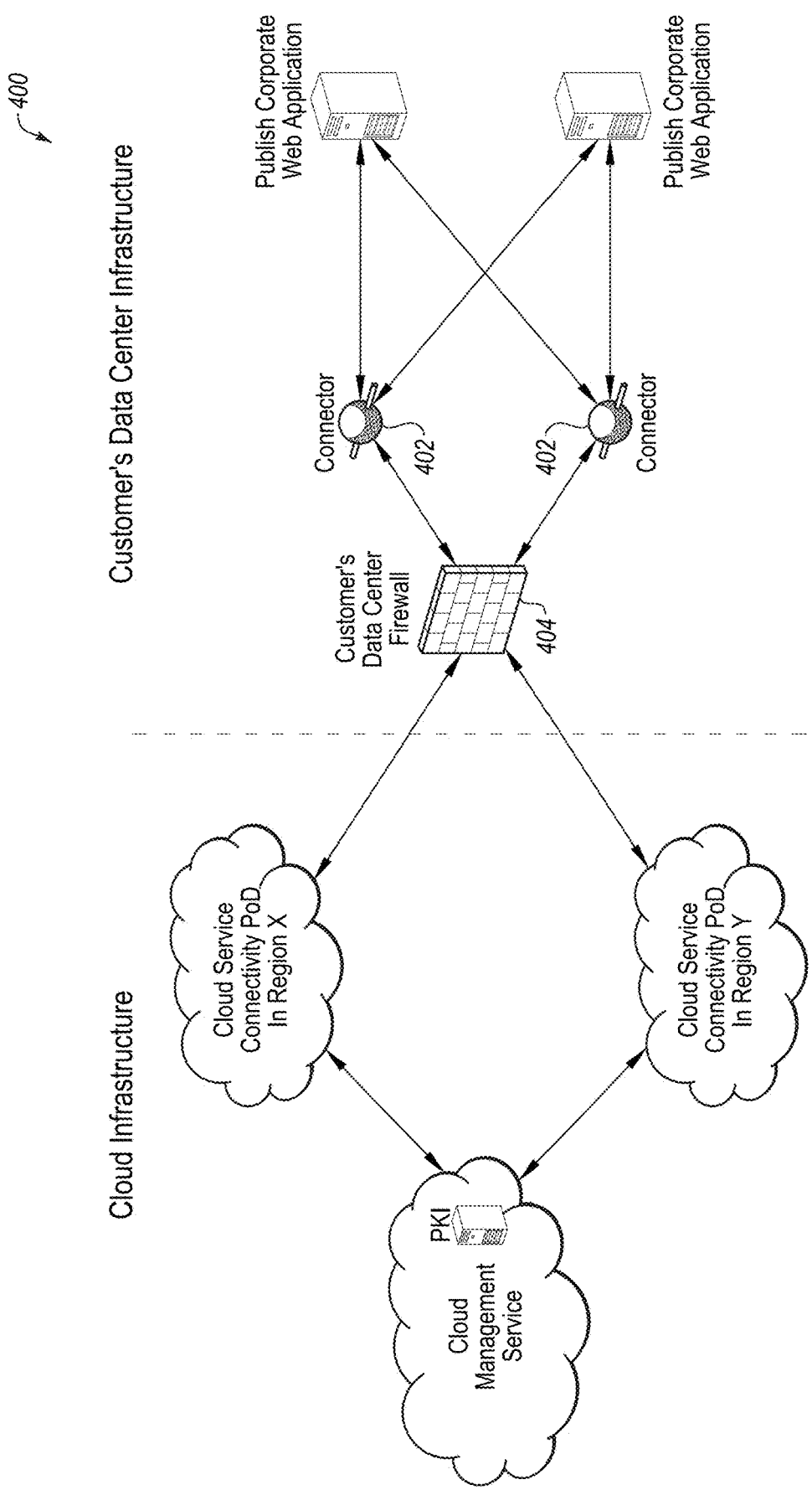
FIG. 4 illustrates an example communication scheme.

Layer 5 of FIG. 2 is a connectivity layer. The connectivity between the connectors 208 and the secure access cloud PoDs 206 may be performed via outgoing connections (e.g., from the connectors 208 that are deployed inside the corporate datacenters 212 behind firewall 214), such as over TCP Port 443 to the secure access cloud PoD 206. Minimizing the number of ports/services used and reducing (e.g., to zero) the number of required changes in the existing perimeter security policies deployed in the corporate datacenters 212 may result in relatively fast deployment of the service. Each connector 208 may open a number of persistent communication channels to one or more secure access cloud PoD 206, and the connector 208 might open/close connections based on the configured applications and the load on those applications (e.g., elasticity based). FIG. 4 illustrates an example communication scheme 400. In particular, FIG. 4 illustrates various technical details of the communications between the connectors 402 (e.g., which may be deployed in physical or virtual datacenters hosting applications) and the secure access cloud PoDs. As illustrated in FIG. 4, the communications between the connectors and the secure access cloud PoDs may be carried out over TCP Port 443 and may be initiated by the connectors 402. The datacenter's firewall 404 may be required to allow outbound communication on this port to secure access cloud destinations. The outbound connections may be carried out with a binary protocol. The connections may be long-term/persistent, but if they are terminated, the connector 402 may attempt to recreate them as quickly as possible. The connections may be secured using TLS with both sides authenticating each other (including certificate pinning) as follows:

Secure Cloud Service—Each PoD (e.g., each component that terminates TLS inside each PoD) may have ephemeral certificates that are allocated by a dynamic PKI. The connector may be capable of checking the validity of these certificates to make sure that it is communicating directly with the secure cloud service.

Connector—When initiated, each connector 402 may receive an ephemeral One Time Password/Token (OTP), allowing it to establish initial communications with the secure cloud service and pull a TLS certificate. From this point, every communication between the connector 402 and the secure cloud service may be done with the certificate, including pulling new certificates (e.g., rotation of certificates). The secure cloud service may perform a strong pinning of each new certificate for each connector 402, monitor anomalies regarding the usage of various client certificates, and/or enforce strong segmentation in access to data and services based on the presented client certificate of a connector 402.

The above scheme may ensure that the connectivity between the connector 402 and the secure cloud service is carried out with the highest level of security, using the most up-to-date cipher suites and without any inspection in the middle. In cases where a TLS inspection of all traffic going from a data center to Internet services is required, trust can be established by connectors 402, cloud service PoDs, and a TLS-intercepting Secure Web Gateway/Proxy.

Layer 6 of FIG. 2 is a connector layer. Connectors 208 may be lightweight software agents that are deployed in the corporate datacenters 212 (which may be physical or virtual). Connectors 208 may help implement network access isolation, required by the Zero Trust Access model, by opening outbound communication channels to the secure access cloud PoDs 206 and brokering the requests from accessing parties to the corporate applications 216, services 218, and workloads 220. Connectors 208 may be cloud-native resilient and scalable components, and may be distributed as Docker Containers, as well as using other means. Connectors 208 may be deployed on any physical or virtual server, as well as inside Container Orchestration environments including, but not limited to, Kubernetes, Amazon Elastic Container Service, Azure Container Instances, etc. Connectors 208 may support full high-availability and load-balancing and may scale horizontally to support a growing number of connections. Upon its creation, each connector 208 may be initiated with a unique One-Time Token.

Layer 7 of FIG. 2 is a connectivity to applications/services layer. Connectivity between the connectors 208 and the corporate applications 216, services 218, and workloads 220 that are accessed via the secure access cloud PoDs 206 may take place inside the corporate datacenters 212. The number of connectors 208 in each corporate datacenter 212 may depend on the network segmentation strategy adopted by the organization using secure access cloud PoDs 206. The connectors 208 may be configured to be able to access the internal address of the configured resource via TCP/IP and, in relevant cases, UDP. Internal network segmentation strategies may be adopted that are targeted at preventing lateral movements resulting from potential application vulnerabilities. There may be no limitation on the number of connectors 208 that can be deployed in a single environment. Further, encrypted communications may be used inside the corporate datacenter 212. For example, when defining internal addresses for web applications or Representational State Transfer (REST)/Simple Object Access Protocol (SOAP) Application Programming Interface (API) endpoints, it may be preferable to use Hypertext Transfer Protocol Secure (HTTPS) over Hypertext Transfer Protocol (HTTP).

If an Enterprise Certificate Authority (CA) is used for internal HTTPS communications, trust may be configured between the Enterprise CA and the connectors 208. The connectors 208 deployed in the corporate datacenters 212 may open two types of secure HTTPS connections, namely (1) connections with the secure access cloud PoDs 206, and (2) connections with internal corporate applications 216. Authentication for connectivity of type (1) may be carried out with certificates issued by Certificate Authorities (CAs) that can be recognized and validated by the connectors 208. One exception may be when dealing with authorized enterprise TLS-inspecting proxies deployed in the corporate datacenters 212. Authentication for connectivity of type (2) (e.g. connections with internal web servers deployed in the customers' datacenters 212 using HTTPS) can require the connector 208 to validate certificates that are either self-signed or are issued by a CA that is not generally recognizable. Self-signed certificates or CA root certificates for validating certificates issued by Enterprise CAs may be added to the list of trusted certificates for all the connectors 208 running in the relevant corporate datacenters 212.

Figure 5A:
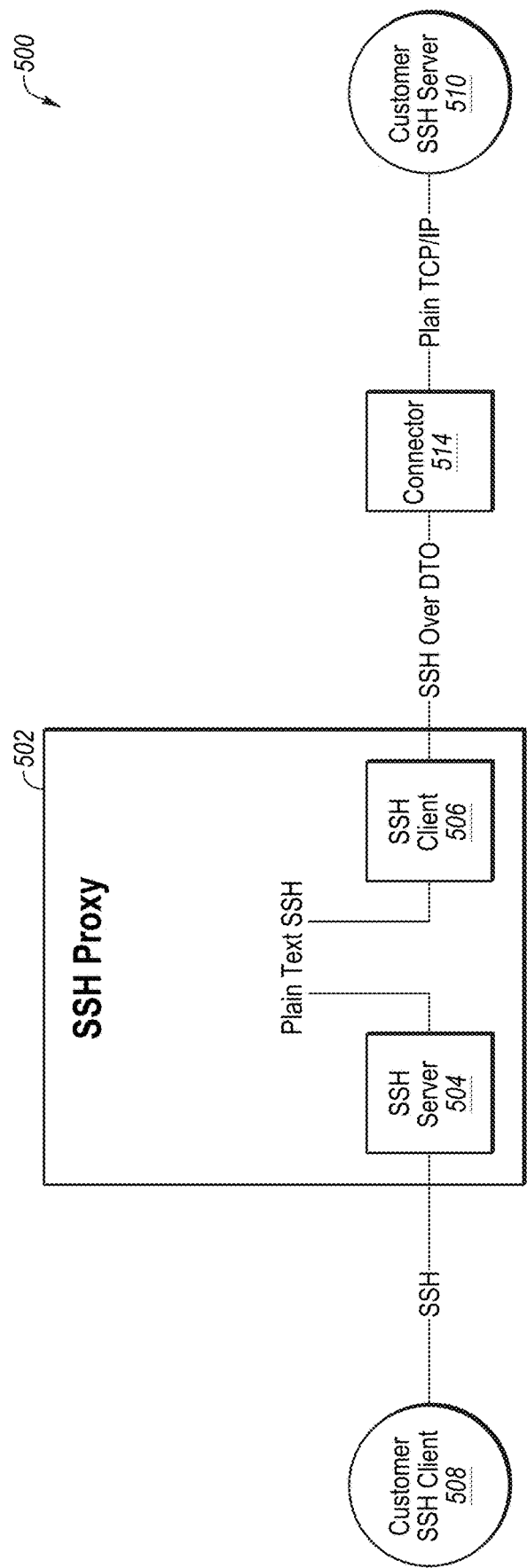
FIGS. 5A and 5B illustrate a system with support for separate authentication (token/certificate) of users.
Figure 5B:
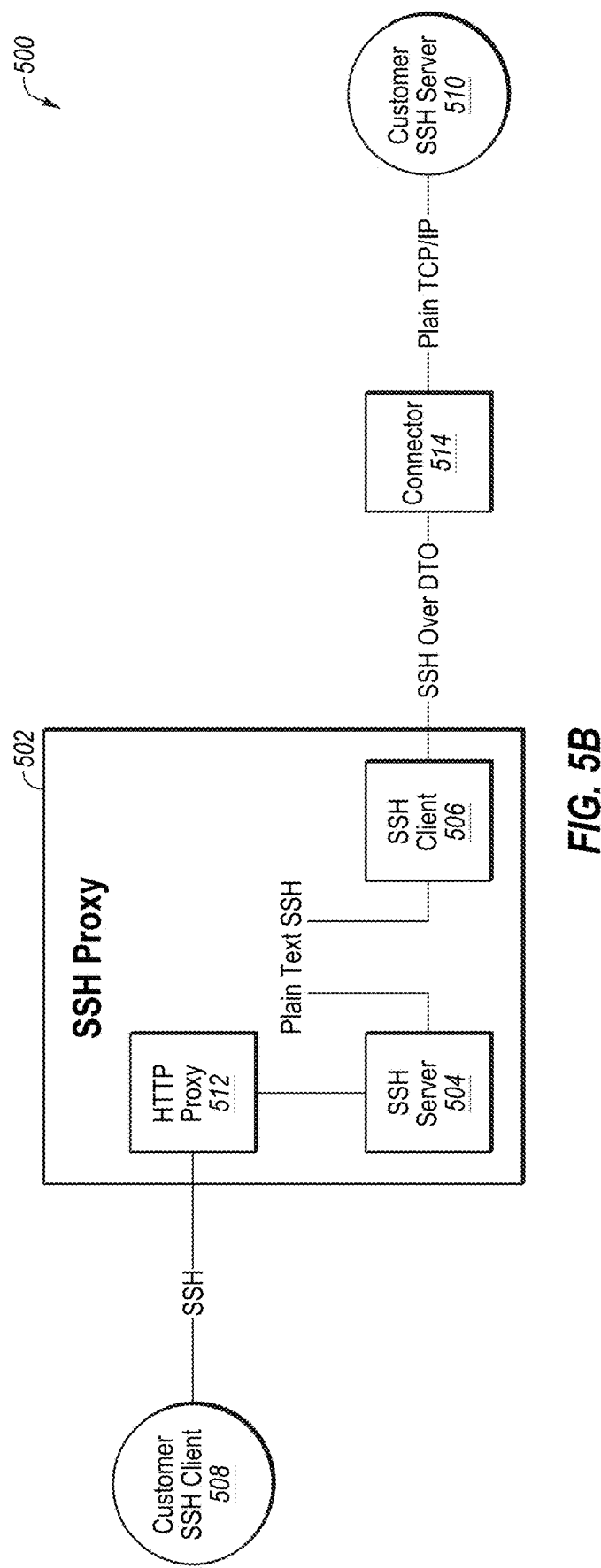

FIGS. 5A and 5B illustrate a system 500 with support for separate authentication (Token/Certificate) of users. An SSH proxy 502 (e.g., a facade) may include a transparent (to the end-user) implementation of an SSH server 504 and SSH client 506 pair. The SSH server 504 may serve the session incoming from the actual customer SSH client 508, but, instead of processing the requests locally, after analyzing (and, if needed, as described above, modifying them) may pass them to the built-in SSH client 506 that, in turn may send them to the actual facaded resource—an actual customer SSH server 510, as illustrated in FIG. 5A. A similar approach may be taken if a customer SSH client 508 is using an HTTP proxy 512 (which could be an HTTPS proxy), as illustrated in FIG. 5B.

In some embodiments, a communication between the internal SSH client 506 and the customer SSH server 510 may be done via a connector 514. In some embodiments, there may be a complete separation of authentication that the user performs on the side of the customer SSH client 508 from the one that is performed by an internal (and transparent) SSH client 506 to the real customer SSH server 510. In other words, end users/consumers of the resources of the customer SSH server 510 may never be provided with any token/account that can be leveraged by them for a direct access to the customer SSH server 510. Instead, the end users/consumers may only be allowed the option of a brokered access, which may be managed by the SSH proxy 502 (e.g., a facade), as described herein.

In some embodiments, the facade may be created for an internal corporate resource (e.g., a web server, a REST API server, an SSH server, or any other server/service, based on a TCP or UDP protocol) that is accessible via the Internet in a secure manner. The facade may not expose the internal corporate resource (e.g., internal to a corporate datacenter by being behind a corporate firewall) in any way, and may not allow unauthenticated or unprotected access to the internal corporate resource. However, the facade may resemble the behavior of the actual internal corporate resource. The facade may be virtual in that it is not created ahead of time, but is instead created on demand. For example, when a client connection attempting to access a certain corporate resource is being accepted by one of a secure access cloud PoD, a per-session facade posing as the actual corporate resource may be created ad-hoc. Each facade may have an appearance similar to the original corporate resource in at least two ways. First, the facade may have a DNS name and port resolving to it, with both of these resources being shared between multiple facades, but this may be unknown to the accessing client. Second, when connecting to this DNS name and port, and passing authentication/authorization, the client may believe it is being connected to the actual corporate resource.

Figure 6:
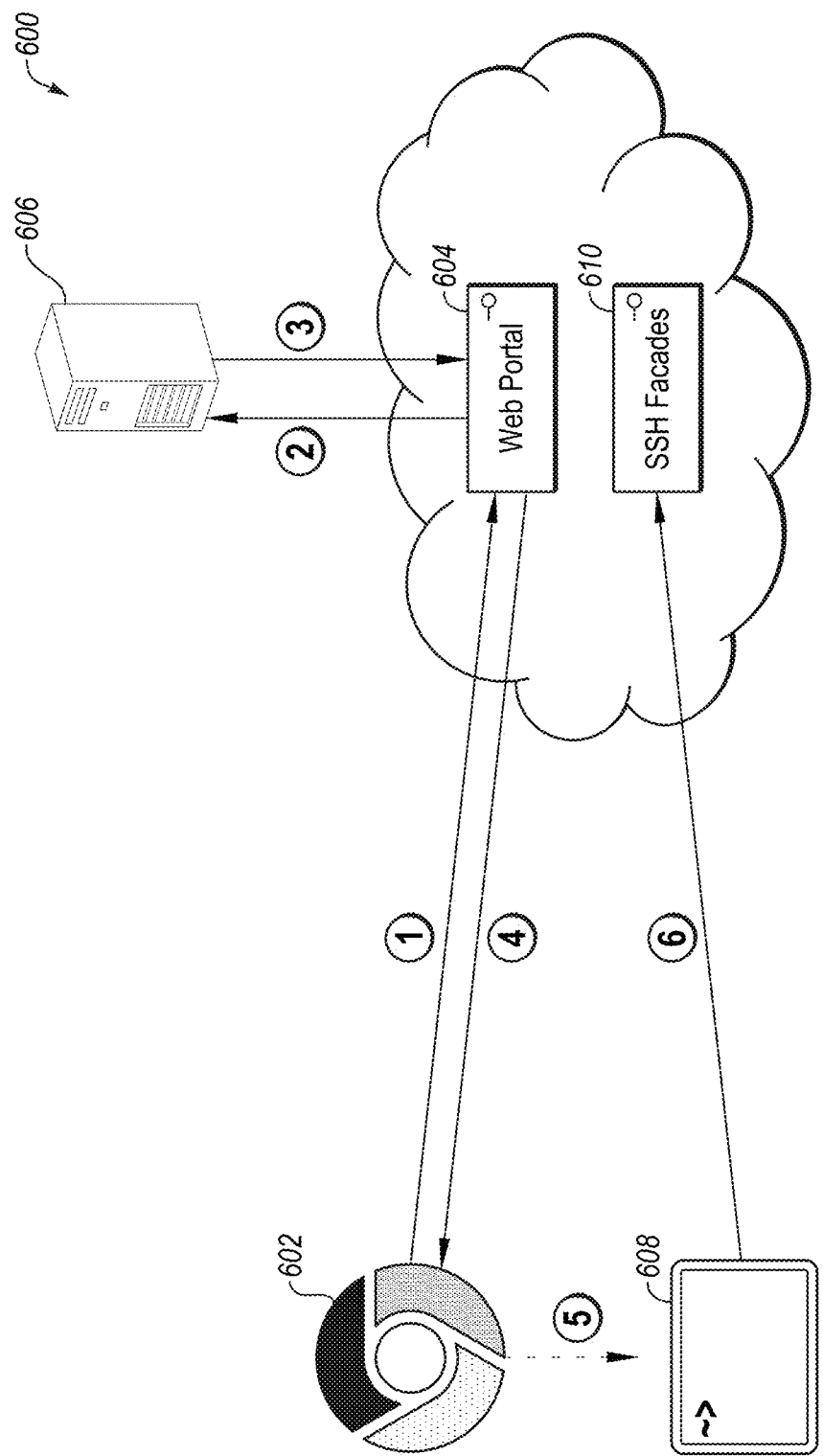
FIG. 6 illustrates a system for authentication of the end-user sessions.

FIG. 6 illustrates a system 600 for authentication of the end-user sessions. A token-based authentication, tied to an identity provider (IdP) account of the accessing user, may include at least the following steps, as illustrated in FIG. 6:
1. The user may log in to a secure access cloud PoD web portal 604 via a browser 602.
2. In order to perform authentication, the user may be redirected to the corporate IdP 606 that may, in turn, enforce Multi-Factor Authentication (MFA) and other authentication means.
3. The IdP 606 may return entitlements that can be used to authorize the user to specific resources.
4. A short-lived token may be provided from the web portal 604 to the end user at the browser 602.
5. The user may copy the token to the clipboard.
6. The user may launch an SSH session (e.g., via an SSH client 608 of their choice) and may authenticate using the token instead of a password via the SSH facades 610.

Figure 7A:
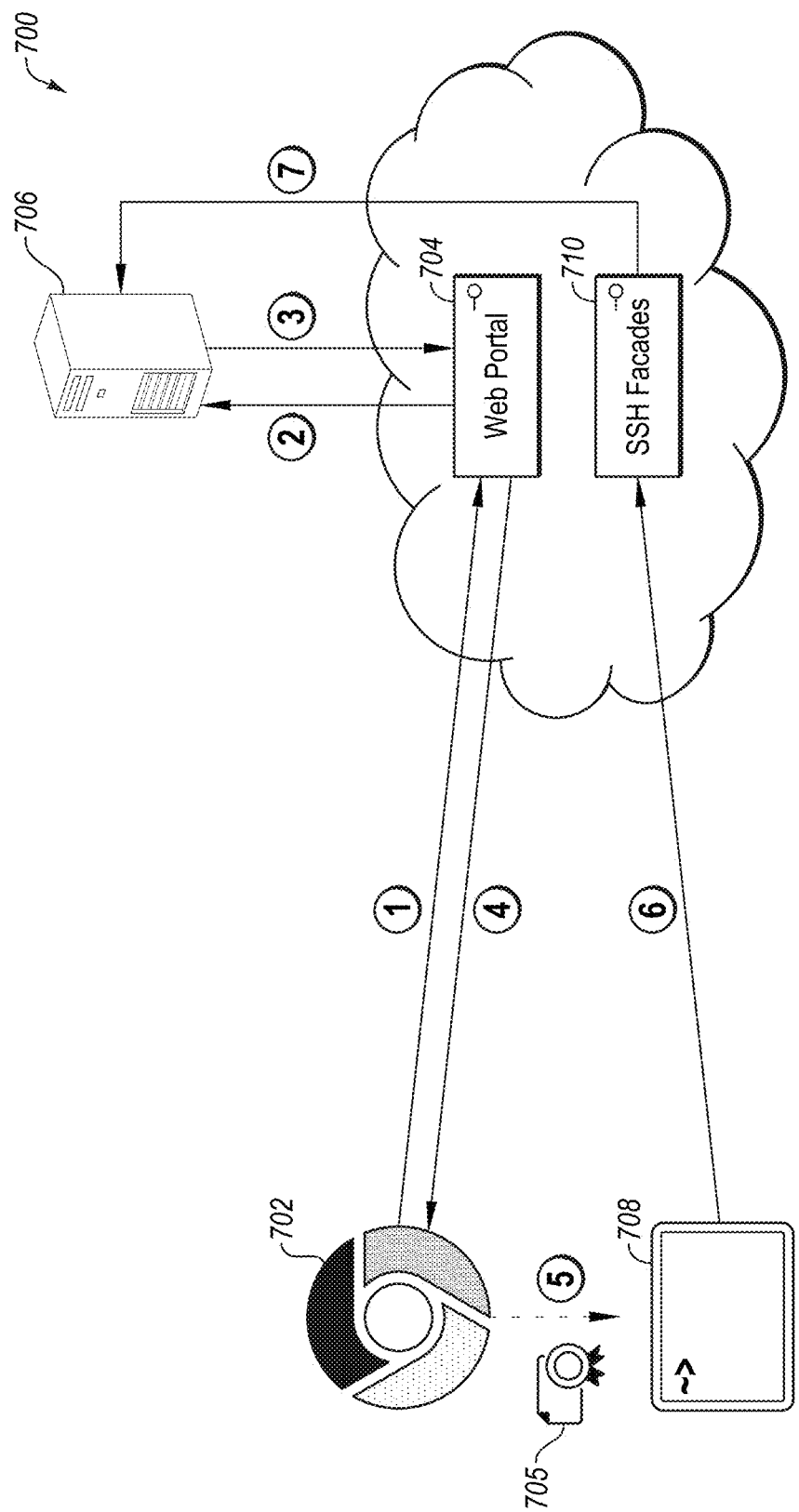
FIGS. 7A and 7B illustrate a system for authenticating internal sessions to actual SSH servers.
Figure 7B:
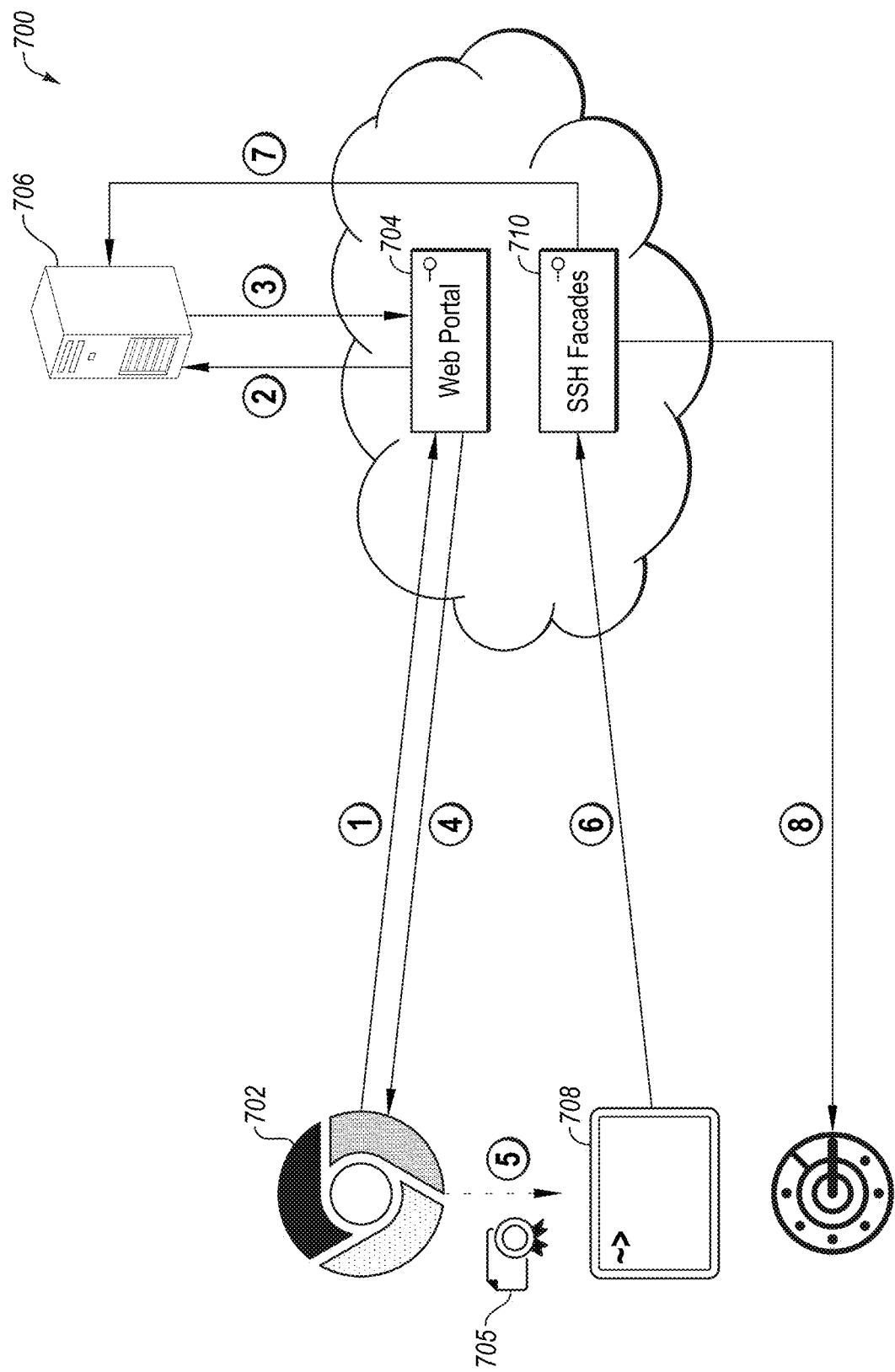

FIGS. 7A and 7B illustrate a system 700 for authenticating internal sessions to actual SSH servers. A certificate-based authentication, tied to the IdP account of the accessing user, may include at least the following steps, as illustrated in FIG. 7A:
1. The user may log in to a secure access cloud PoD web portal 704 via a browser 702.
2. In order to perform authentication, the user may be redirected to the corporate IdP 706 that may, in turn, enforce MFA and other authentication means.
3. The IdP 706 may return entitlements that can be used to authorize the user to specific resources.
4. The web portal 704 may allow the user to generate an SSH certificate 705. The SSH certificate 705 may only serve as an identification for the user, and its expiration and validity may be controlled centrally.
5. The user may use the certificate 704 as authentication means for their SSH client(s).
6. The user may launch an SSH session (e.g., via an SSH client 708 of their choice) and may authenticate using the SSH certificate 705 via the SSH facades 710.
7. The provided SSH certificate 705 may serve for the user's identity, then the IdP 706 may be refreshed with regards to the user's entitlements for proper authorization. It is understood that an authorization may be performed based on IdP data (such as groups, for example). This may be performed by an authorization service that is not talking directly to the IdP 706 but that is using IdP data.

The process of FIG. 7A may be secured even further by enforcing an out-of-bound second factor authentication request to the user upon receiving the certificate, as illustrated in step 8 of FIG. 7B.

Figure 8:
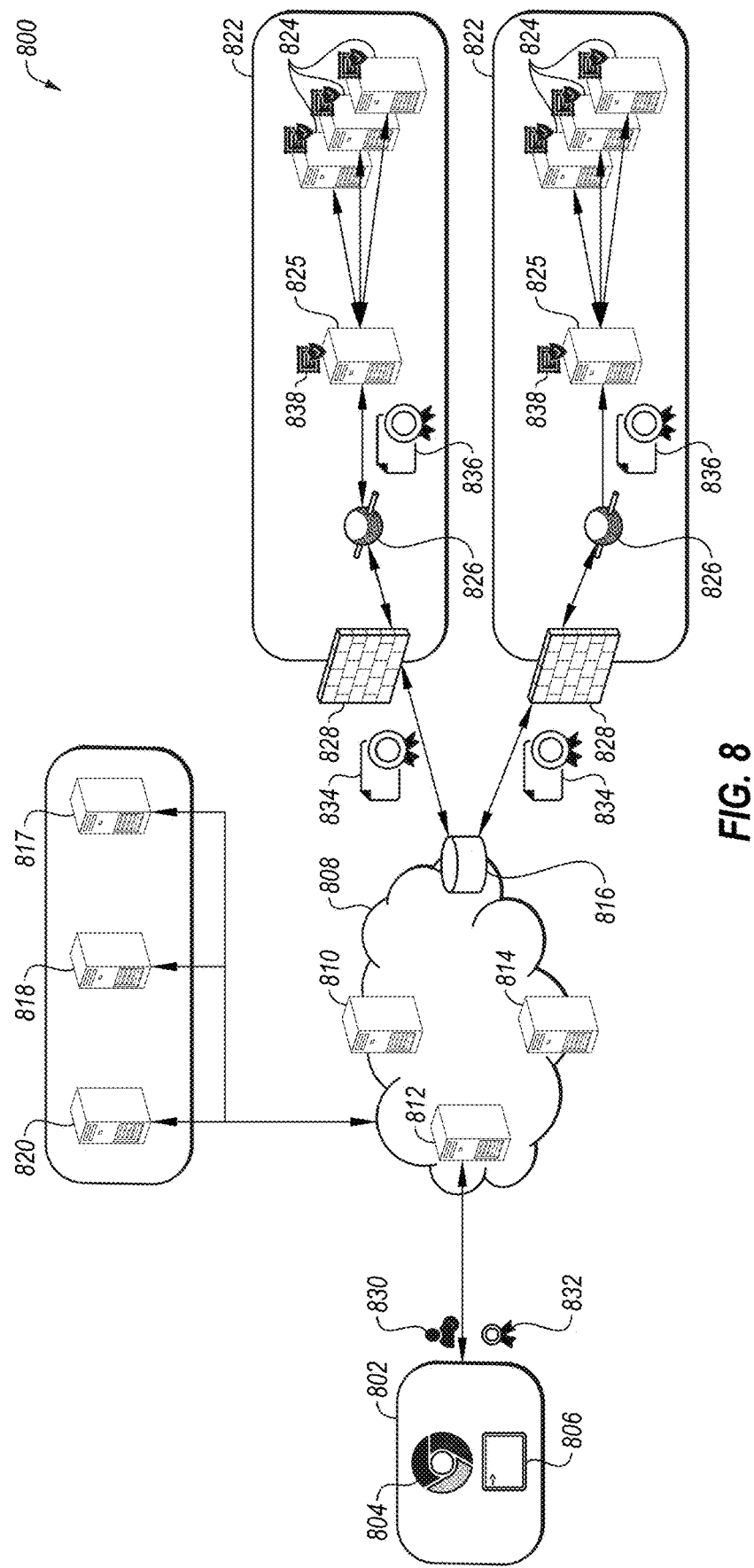
FIG. 8 illustrates a system for transparent virtual agent forwarding.

FIG. 8 illustrates a system 800 for transparent virtual agent forwarding. As disclosed in FIG. 8, the system 800 may include a client 802 having a web browser 804 and an SSH client 806, a secure access cloud PoD 808 having a certificate authority (CA) 810, HTTPS and/or SSH virtual servers 812, a DNS service 814, and an application connectivity proxy 816, an identity provider (IdP) 817, a multi-factor authentication server 818, a device posture/management server 820, and corporate datacenters 822 having SSH servers 824 and 825, connectors 826, and firewalls 828. As disclosed in FIG. 8, the system 800 may include credentials/MFA 830 for HTTP to retrieve an SSH access token 832, the CA 810 may provide secure storage for a CA private key, automated short-lived certificates 834 may be employed for a tunnel, short-lived per-session certificates 836 may be employed with agent forwarding, and the SSH servers 825 may include CA public keys 838.

In some embodiments, when accessing SSH servers 824 for technical maintenance/analysis, one use-case may be to require to move from one virtual/physical server 812 to another within a single session. This use-case may be particularly popular when dealing with application clustering and orchestration technologies, where a single logical application (that may or may not include micro-services) is deployed across a number of machines, and the technical employee accessing the machines requires moving between them throughout the session. Two challenges with the flow in this use-case may be: (1) how to enforce access policy within sessions the same way it was enforced upon accessing a certain SSH server 824 via a facade (e.g., the proxy 816), and (2) how to automate authentication to additional machines the same way it was done upon accessing the original SSH server 824 via a facade (e.g., the proxy 816). The environment presenting these challenges is disclosed in the system 800 of FIG. 8.

As disclosed in FIG. 8, the original SSH server for the connection may be the SSH server 825 in the center of the corporate datacenters 822, while additional target SSH servers 824 are shown on the right. The SSH protocol has a solution for the problem known as an SSH agent. Some embodiments may build on top of the SSH agent by creating a transparent SSH agent within the SSH facade (e.g., the proxy 816) and leveraging it not only to create session keys but also to enforce authorization policy.

An SSH client may be an application used by a user or by an automatic process to establish an SSH connection and perform certain operations within it. An SSH server/SSHD may be a server process allowing connections from SSH clients and responsible for establishing SSH sessions. An SSH agent may be a program, usually running on the same computer as an SSH client, that caches SSH keys/credentials and allows automated authentication. An SSH agent forwarding may be a capability inside an SSH server/SSHD to serve as an SSH agent for new SSH client connections established during an SSH session that it is handling (for another external SSH client).

Figure 9:
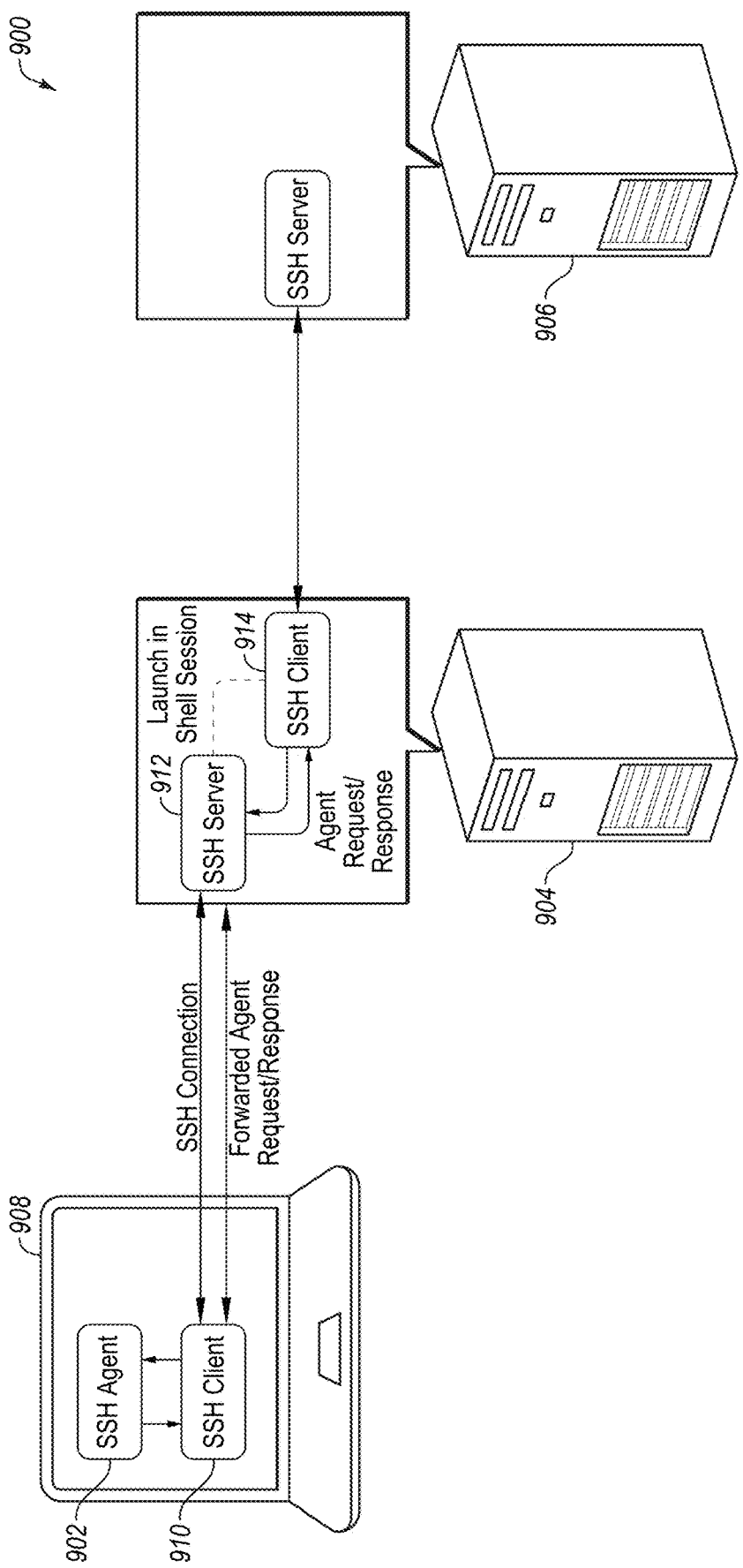
FIG. 9 illustrates a system for an SSH agent and an SSH agent forwarding.

FIG. 9 illustrates a system 900 for an SSH agent 902 and an SSH agent forwarding. As disclosed in FIG. 9, a usage of the SSH agent 902 may be as follows. A user may desire to work with multiple SSH servers 904 and 906 and may like to avoid manual authentication steps to be performed every time. The user may launch the SSH agent 902 on their client machine 908 and may import their keys into an SSH agent cache. Every time the user tries establishing a new SSH connection to some SSH server/SSHD, their SSH client 910, instead of offering an interactive authentication, reaches out to the SSH agent 902 via a dedicated protocol and tries using cached keys for authentication. If successful, new SSH connections/sessions are created for the user without requiring explicit re-authentication.

As disclosed in FIG. 9, a usage of an SSH agent forwarding may be as follows. The user may be inside an SSH session (e.g., a remote interactive shell) that was established via an SSH agent-cached key as previously described. The user may now try to launch a new SSH client 914 (on the target computer where the SSH server 912/SSHD is running) and connect to another SSH server 906. If the SSH agent forwarding is enabled on the first SSH server 912/SSHD, the SSH server 912 will pose as an SSH agent, allowing the newly launched SSH client 914 to connect to it and to serve as an agent for authentication. Upon receiving an agent request, instead of handling it as a regular agent would, the SSH server 912/SSHD forwards it over a dedicated channel to the original SSH client 910 (running on the client machine 908 that the user was using). The SSH client 910, in turn, uses the local agent for handling the authentication request. This process may also be chained such that the agent request is forwarded through more than one computer.

Figure 10:
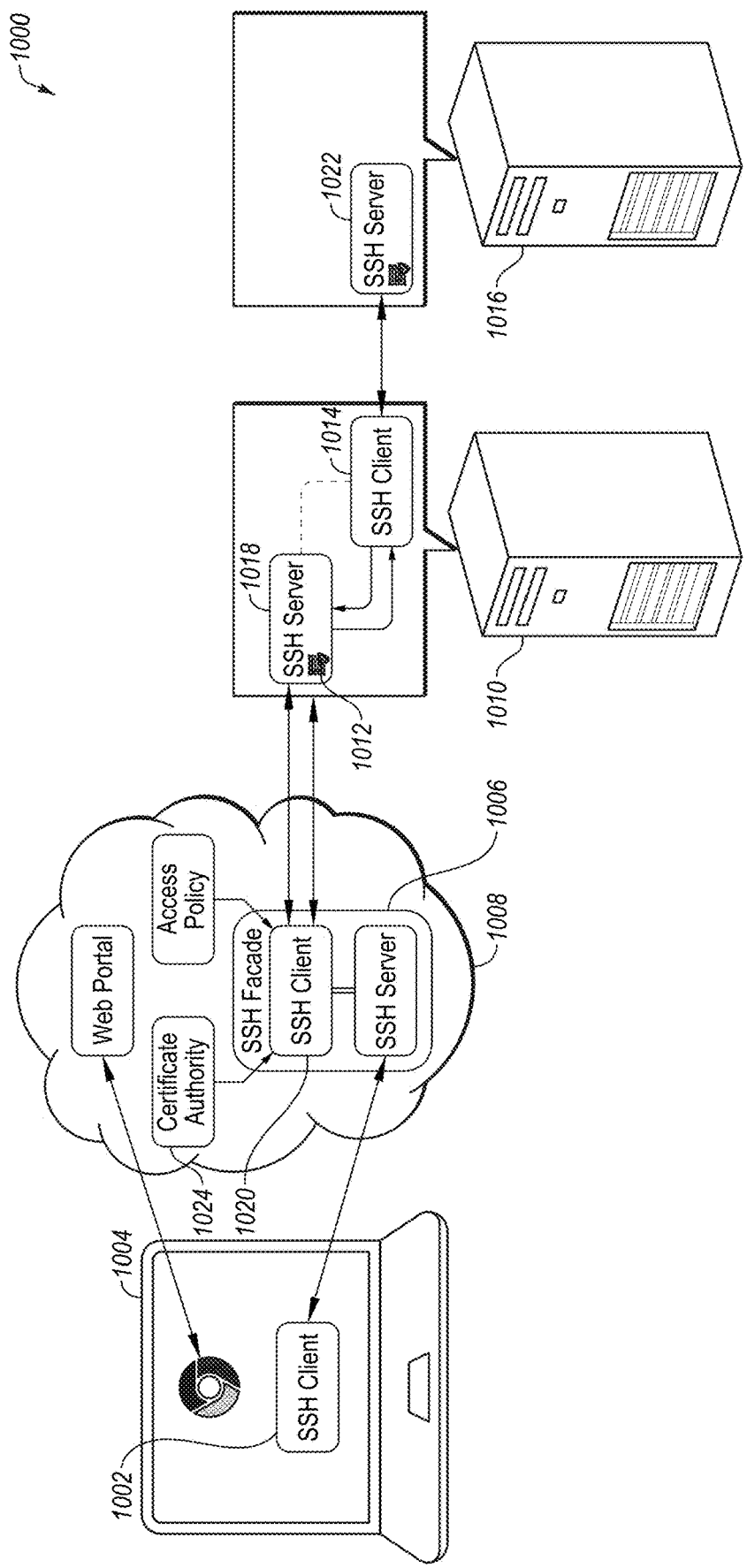
FIG. 10 illustrates a system having a secure access cloud with an SSH facade.

FIG. 10 illustrates a system 1000 for a secure access cloud with an SSH facade. As disclosed in FIG. 10, an SSH client 1002 running on the end user's original workstation 1004 may establish an SSH connection to the SSH facade 1006 inside the secure access cloud PoD 1008, as disclosed above with regard to separate authentication. Authorization of a requested session may be performed, and a one-time certificate may be allocated for an internal session establishment, as disclosed above with regard to dynamic CA with one-time certificates. A session to the first SSH server 1010 may be established (e.g., it may be authenticated via a CA public key, as disclosed above with regard to dynamic CA with one-time certificates). In an interactive shell session on the first server 1010, the user may launch an SSH client 1014 and may attempt connecting to the second server 1016. An SSH client 1014 on the first server may try leveraging an SSH agent (e.g., with the SSH server 1018 on the first server 1010 playing the role of the agent) and may send an agent request. An SSH server 1018 on the first server 1010, posing as an SSH agent for the SSH clients, may receive the request and forward it to the SSH client 1020 connected thereto (e.g., an internal SSH client 1020 inside the SSH facade 1006).

The internal SSH client 1020 inside the SSH facade 1006 may receive the agent request and may execute the following three operations. In a first operation, the SSH client 1020 may reach out to the access policy and may verify that the specified user with the specified session parameters should be allowed to access the second SSH server 1018. In a second operation, the SSH client 1020 may, if the policy decision is favorable, reach out to the certificate authority (CA) 1024 and generate ad-hoc another one-time certificate that may be used to authorize the forwarded agent request and to create a session to the second server 1018. In a third operation, the SSH client 1020 may, similar to the original SSH agent forwarding, be chained, and an agent request issued by an SSH client 1014 running on the second server (for an attempted connection to a potential third server 1022) may be forwarded to an SSH server 1022/SSHD on the second server 1016 posing as an SSH agent, that may, in turn, forward it to the SSH client 1014 running on the first computer, that may, in turn forward it to the SSH server 1018/SSHD posing as an SSH agent on the first server 1010, that may forward it to the internal SSH client 1020 inside the SSH facade 1006.

In some embodiments, no SSH agent need be employed on the users' endpoints, and instead the users may authenticate using a corporate IdP and may use certificates/tokens for authenticating to the secure access cloud PoD 1008 with SSH facades. Further, in some embodiments, the agent, provided as a transparent service, may not cache any keys, and may instead create one-time session keys/certificates on demand. Further, the agent may not just create the keys upon every request, but may further enforce an access policy to make a decision on whether a session key should be provided in a given context.

Figure 11:
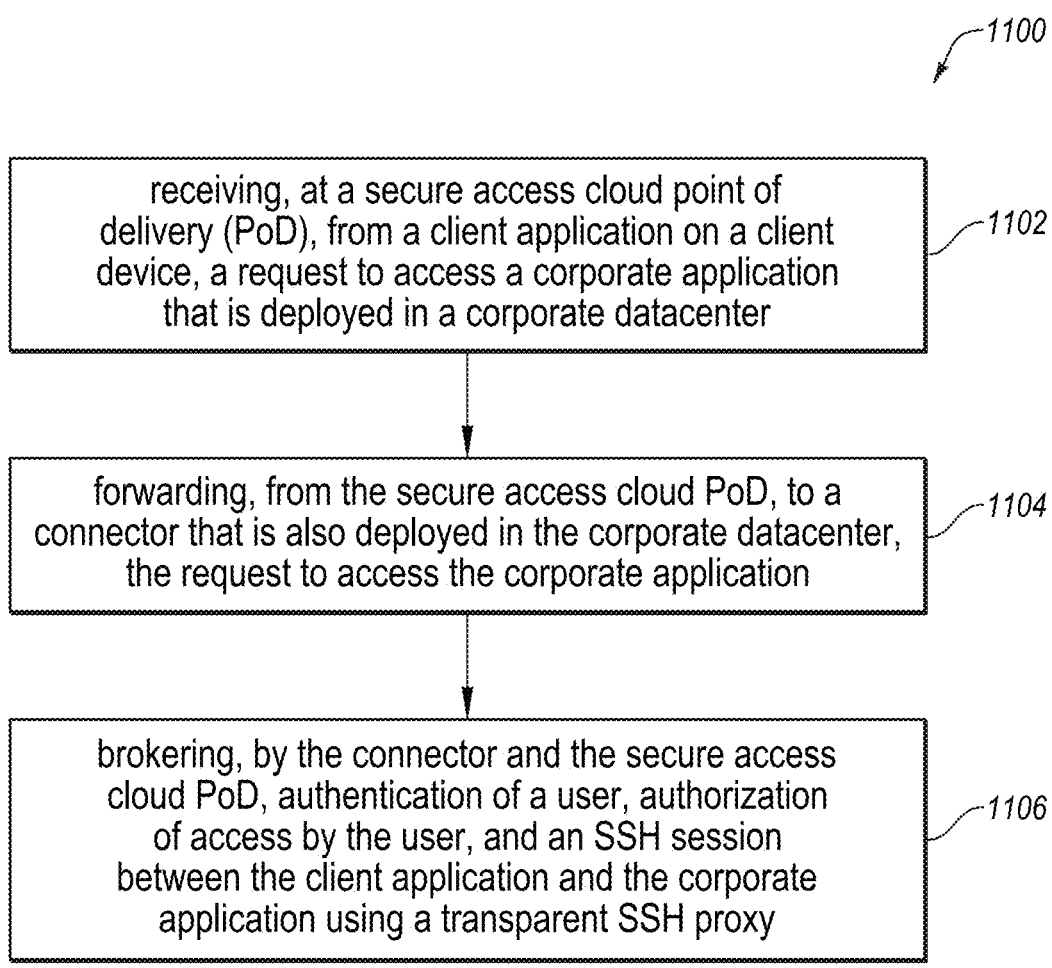
FIG. 11 is a flowchart of an example method for secure access to a corporate application in an SSH session using a transparent SSH proxy.

FIG. 11 is a flowchart of an example method 1100 for secure access to a corporate application in a secure shell (SSH) session using a transparent SSH proxy. The method 1100 may be performed, in some embodiments, by a device or system, such as by a connector (e.g., the connector 514 of FIG. 5A) deployed inside a corporate datacenter (which may be physical or virtual), a cloud service Point of Delivery (PoD) (e.g., the secure access cloud PoD 206 of FIG. 4), a corporate resource (e.g., the customer SSH Server 510 of FIG. 5A), and/or a user device (e.g., the customer SSH client 508 of FIG. 5A), or associated applications thereof. In these and other embodiments, the method 1100 may be performed by one or more processors based on one or more computer-readable instructions stored on one or more non-transitory computer-readable media. The method 1100 will now be described in connection with FIGS. 1-11.

The method 1100 may include, at action 1102, receiving, at a secure access cloud point of delivery (PoD), from a client application on a client device, a request to access a corporate application that is deployed in a corporate datacenter. For example, a client application (e.g. the customer SSH client 508) may send and the secure access cloud PoD 206 (on which the SSH Proxy 502 may be deployed) may receive, at action 1102, a request to access a corporate application (e.g., the customer SSH server 510) that is deployed in a corporate datacenter.

The method 1100 may include, at action 1104, forwarding, from the secure access cloud PoD, to a connector that is also deployed in the corporate datacenter, the request to access the corporate application. For example, the secure access cloud PoD 206 (on which the SSH Proxy 502 may be deployed) may forward, at action 1104, the request to access the corporate application (e.g., the customer SSH server 510) to the connector 514 that is also deployed in the corporate datacenter.

The method 1100 may include, at action 1106, brokering, by the connector and the secure access cloud PoD, authentication of a user, authorization of access by the user, and a secure communication session between the client application and the corporate application using a transparent SSH proxy. In some embodiments, this brokering may occur with no corresponding agent being installed at the client device, and with the client application being unaware that the secure communication session is brokered by the connector and the secure access cloud PoD. For example, the connector 514 and the secure access cloud PoD 206 (on which the SSH Proxy 502 may be deployed) may broker, at action 1106, authentication of a user, authorization of access by the user, and an SSH session between the client application (e.g. the customer SSH client 508) and the corporate application (e.g., the customer SSH server 510). In this example, the brokering at action 1106 may occur with no corresponding agent being installed at the client machine, and with the client application on the client machine being unaware that the secure communication session is brokered by the connector 514 and the secure access cloud PoD 206.

In some embodiments, the transparent SSH proxy may include an SSH server paired with an SSH client that are both transparent to the client application. In these embodiments, the method may further include receiving SSH session requests, at the SSH server, from the client application, sending the SSH session requests, from the SSH server, to the SSH client, and sending the SSH session requests, from the SSH client, to the corporate application via the connector. Also, in these embodiments, authentication between the client application and the SSH server may be separate from authentication between the SSH client and the corporate application to prevent direct access to the corporate application by the client application. For example, the transparent SSH proxy 502 may include the SSH server 504 paired with the SSH client 506 that are both transparent to the customer SSH client 508. The SSH server 504 may receive SSH session requests from the customer SSH client 508, the SSH server 504 may send the SSH session requests to the SSH client 506, and the SSH client 506 may send the SSH session requests to the customer SSH server via the connector 514. Also, authentication between the customer SSH client 508 and the SSH server 504 may be separate from authentication between the SSH client 506 and the customer SSH server 510 to prevent direct access to the customer SSH server 510 by the customer SSH client 508.

In addition, in the embodiments above, the SSH proxy may further include an HTTP/S proxy, and the method may include receiving SSH session requests, at the HTTP/S proxy, from the client application, sending the SSH session requests, from the HTTP/S proxy, to the SSH server. For example, the transparent SSH proxy 502 may further include the HTTP proxy 512. In this example, the HTTP proxy 512 may receive SSH session requests from the customer SSH client 508, and the HTTP proxy 512 may send the SSH session requests to the SSH server 504.

In some embodiments, the authentication of the user may be performed using an identity provider (IdP). In these embodiments, the authentication of the user using the IdP may include the user logging in to a web portal, redirecting the user to the IdP which enforces authentication of the user, returning, from the IdP, a token, and authenticating the user in the SSH session using the token. Also, in these embodiments, the IdP may enforce Multi-Factor Authentication (MFA) of the user. Alternatively, in these embodiments, the authentication of the user using the IdP may include the user logging in to a web portal, redirecting the user to the IdP which enforces authentication of the user, returning, from the IdP, an SSH certificate, and authenticating the user in the SSH session using the SSH certificate. Also, in these embodiments, the IdP may enforce MFA of the user. Further, in these embodiments, the SSH certificate may also be used for the authorization of access by the user. Also, in these embodiments, an expiration and/or a validity of the SSH certificate may be controlled by the transparent SSH proxy. Further, in these embodiments, the method may further include enforcing an out-of-bound second factor authentication request to the user.

In some embodiments, the transparent SSH proxy may have a transparent SSH agent. In these embodiments, the transparent SSH agent may create session keys for the SSH session and/or may enforce authorization policy for the SSH session. Also, in these embodiments, the transparent SSH agent may cache SSH keys/credentials for the SSH session and may allow automated authentication of the user.

The method 1100 may thus be employed, in some embodiments, to accomplish secure access to one or more corporate applications in an SSH session using a transparent SSH proxy. Although the actions of the method 1100 are illustrated in FIG. 11 as discrete actions, various actions may be divided into additional actions, combined into fewer actions, reordered, expanded, or eliminated, depending on the desired implementation.

Further, it is understood that the method 1100 may improve the functioning of a computer system itself, and improve the technical field of SSH sessions. For example, the functioning of the customer SSH server 510 may be improved by the method 1100 due to the customer SSH client 508 being granted secure access to the customer SSH server 510 by the brokering of an SSH session by the secure access cloud PoD 206 using the transparent SSH Proxy 502 and the connector 514. Further, this may be accomplished with no corresponding agent being installed at the client machine, and with the customer SSH client 508 being unaware that the SSH session is brokered by the connector 514 and the secure access cloud PoD 206, unlike conventional VPN software which generally requires an agent to be installed on the client.

Figure 12:
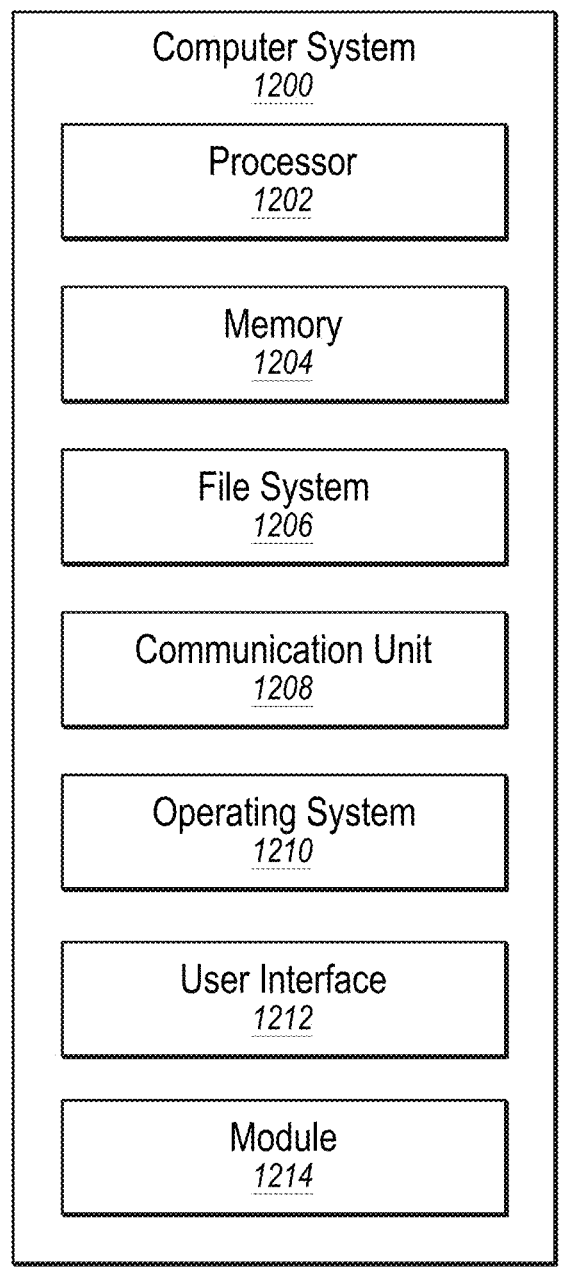
FIG. 12 illustrates an example computer system that may be employed in secure access to a corporate application in an SSH session using a transparent SSH proxy.

FIG. 12 illustrates an example computer system 1200 that may be employed in providing secure access to a corporate application in an SSH session using a transparent SSH proxy. In some embodiments, the computer system 1200 may be part of any of the systems or devices described in this disclosure. For example, the computer system 1200 may be part of any client, server, cloud service, firewall, connector, proxy, facade, application, or resource of FIGS. 1-10.

The computer system 1200 may include a processor 1202, a memory 1204, a file system 1206, a communication unit 1208, an operating system 1210, a user interface 1212, and a module 1214, which all may be communicatively coupled. In some embodiments, the computer system may be, for example, a desktop computer, a client computer, a server computer, a workstation computer, a mobile phone, a laptop computer, a smartphone, a smartwatch, a tablet computer, a portable music player, or any other computer system.

Generally, the processor 1202 may include any suitable special-purpose or general-purpose computer, computing entity, or processing device including various computer hardware or software applications and may be configured to execute instructions stored on any applicable computer-readable storage media. For example, the processor 1202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 1202 may interpret and/or execute program instructions and/or process data stored in the memory 1204 and/or the file system 1206. In some embodiments, the processor 1202 may fetch program instructions from the file system 1206 and load the program instructions into the memory 1204. After the program instructions are loaded into the memory 1204, the processor 1202 may execute the program instructions. In some embodiments, the instructions may include the processor 1202 performing one or more steps of the processes disclosed herein.

The memory 1204 and the file system 1206 may include computer-readable storage media for carrying or having stored thereon computer-executable instructions or data structures. Such computer-readable storage media may be any available non-transitory media that may be accessed by a general-purpose or special-purpose computer, such as the processor 1202. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1202 to perform a certain operation or group of operations, such as one or more steps of the processes disclosed herein. These computer-executable instructions may be included, for example, in the operating system 1210, in one or more modules, such as the module 1214, or in some combination thereof.

The communication unit 1208 may include any component, device, system, or combination thereof configured to transmit or receive information over a network. In some embodiments, the communication unit 1208 may communicate with other devices at other locations, the same location, or even other components within the same system. For example, the communication unit 1208 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 1208 may permit data to be exchanged with a network and/or any other devices or systems, such as those described in the present disclosure.

The operating system 1210 may be configured to manage hardware and software resources of the computer system 1200 and configured to provide common services for the computer system 1200.

The user interface 1212 may include any device configured to allow a user to interface with the computer system 1200. For example, the user interface 1212 may include a display, such as an LCD, LED, or other display, that is configured to present video, text, application user interfaces, and other data as directed by the processor 1202. The user interface 1212 may further include a mouse, a track pad, a keyboard, a touchscreen, volume controls, other buttons, a speaker, a microphone, a camera, any peripheral device, or other input or output device. The user interface 1212 may receive input from a user and provide the input to the processor 1202. Similarly, the user interface 1212 may present output to a user.

The module 1214 may be one or more computer-readable instructions stored on one or more non-transitory computer-readable media, such as the memory 1204 or the file system 1206, that, when executed by the processor 1202, is configured to perform one or more steps of the processes disclosed herein. In some embodiments, the module 1214 may be part of the operating system 1210 or may be part of an application of the computer system 1200, or may be some combination thereof. In some embodiments, the module 1214 may function as any software component disclosed herein.

Modifications, additions, or omissions may be made to the computer system 1200 without departing from the scope of the present disclosure. For example, although each is illustrated as a single component in FIG. 12, any of the components 1202-1214 of the computer system 1200 may include multiple similar components that function collectively and are communicatively coupled. Further, although illustrated as a single computer system, it is understood that the computer system 1200 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 1202 of FIG. 12) including various computer hardware or software applications, as discussed in greater detail below. Further, as indicated above, embodiments described herein may be implemented using computer-readable media (e.g., the memory 1204 or file system 1206 of FIG. 12) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for secure access to a corporate application in a secure shell (SSH) session using a transparent SSH proxy, at least a portion of the method being performed by a computer system comprising one or more processors, the method comprising:
   receiving, at a secure access cloud point of delivery (PoD), from a client application on a client device, a request to access a corporate application that is deployed in a corporate datacenter;
   forwarding, from the secure access cloud PoD, to a connector that is also deployed in the corporate datacenter, the request to access the corporate application; and
   brokering, between the connector and the secure access cloud PoD, authentication of a user, authorization of access by the user, and an SSH session between the client application and the corporate application using a transparent SSH proxy deployed at the secure access cloud PoD, with no corresponding agent being installed at the client device, and with the client application being unaware that the SSH session is brokered by the connector and the secure access cloud PoD.

2. The method of claim 1, wherein the transparent SSH proxy comprises an SSH server paired with an SSH client that are both transparent to the client application.

3. The method of claim 2, further comprising:
   receiving SSH session requests, at the SSH server, from the client application;
   sending the SSH session requests, from the SSH server, to the SSH client; and
   sending the SSH session requests, from the SSH client, to the corporate application via the connector.

4. The method of claim 3, wherein authentication between the client application and the SSH server is separate from authentication between the SSH client and the corporate application to prevent direct access to the corporate application by the client application.

5. The method of claim 1, wherein the transparent SSH proxy comprises:
   an SSH server paired with an SSH client that are both transparent to the client application; and
   an HTTP/S proxy.

6. The method of claim 5, further comprising:
   receiving SSH session requests, at the HTTP/S proxy, from the client application;
   sending the SSH session requests, from the HTTP/S proxy, to the SSH server;
   sending the SSH session requests, from the SSH server, to the SSH client; and
   sending the SSH session requests, from the SSH client, to the corporate application via the connector.

7. The method of claim 6, wherein authentication between the client application and the SSH server is separate from authentication between the SSH client and the corporate application to prevent direct access to the corporate application by the client application.

8. A computer-implemented method for secure access to a corporate application in an SSH session using a transparent SSH proxy, at least a portion of the method being performed by a computer system comprising one or more processors, the method comprising:
   receiving, at a secure access cloud point of delivery (PoD), from a client application on a client device, a request to access a corporate application that is deployed in a corporate datacenter;
   forwarding, from the secure access cloud PoD, to a connector that is also deployed in the corporate datacenter, the request to access the corporate application; and
   brokering, between the connector and the secure access cloud PoD, authentication of a user using an identity provider (IdP), authorization of access by the user, and an SSH session between the client application and the corporate application using a transparent SSH proxy deployed at the secure access cloud PoD, with no corresponding agent being installed at the client device, and with the client application being unaware that the SSH session is brokered by the connector and the secure access cloud PoD.

9. The method of claim 8, wherein the authentication of the user using the IdP comprises: the user logging in to a web portal;
   redirecting the user to the IdP which enforces authentication of the user;
   returning, from the IdP, a token; and
   authenticating the user in the SSH session using the token.

10. The method of claim 9, wherein the IdP enforces Multi-Factor Authentication (MFA) of the user.

11. The method of claim 8, wherein the authentication of the user using the IdP comprises:
   the user logging in to a web portal;
   redirecting the user to the IdP which enforces authentication of the user;
   returning, from the IdP, an SSH certificate; and
   authenticating the user in the SSH session using the SSH certificate.

12. The method of claim 11, wherein the IdP enforces Multi-Factor Authentication (MFA) of the user.

13. The method of claim 11, wherein the SSH certificate is also used for the authorization of access by the user.

14. The method of claim 13, wherein an expiration of the SSH certificate is controlled by the transparent SSH proxy.

15. The method of claim 13, wherein a validity of the SSH certificate is controlled by the transparent SSH proxy.

16. The method of claim 11, further comprising enforcing an out-of-bound second factor authentication request to the user.

17. A computer-implemented method for secure access to a corporate application in an SSH session using a transparent SSH proxy, at least a portion of the method being performed by a computer system comprising one or more processors, the method comprising:

receiving, at a secure access cloud point of delivery (PoD), from a client application on a client device, a request to access a corporate application that is deployed in a corporate datacenter;

forwarding, from the secure access cloud PoD, to a connector that is also deployed in the corporate datacenter, the request to access the corporate application; and brokering, between the connector and the secure access cloud PoD, authentication of a user, authorization of access by the user, and an SSH session between the client application and the corporate application using a transparent SSH proxy, deployed at the secure access cloud PoD, the SSH proxy having a transparent SSH agent, with no corresponding agent being installed at the client device, and with the client application being unaware that the SSH session is brokered by the connector and the secure access cloud PoD.

18. The method of claim 17, wherein the transparent SSH agent creates session keys for the SSH session.

19. The method of claim 17, wherein the transparent SSH agent enforces authorization policy for the SSH session.

20. The method of claim 17, wherein the transparent SSH agent caches SSH keys/credentials for the SSH session and allows automated authentication of the user.

* * * * *